United States Patent
Miyauchi

(10) Patent No.: US 10,602,145 B2
(45) Date of Patent: Mar. 24, 2020

(54) IMAGE ENCODING APPARATUS AND CONTROL METHOD THEREOF

(71) Applicant: CANON KABUSHIKI KAISHA, Tokyo (JP)

(72) Inventor: Dai Miyauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 15/612,056

(22) Filed: Jun. 2, 2017

(65) Prior Publication Data

US 2017/0359579 A1    Dec. 14, 2017

(30) Foreign Application Priority Data

Jun. 14, 2016    (JP) .................................. 2016-118323

(51) Int. Cl.

| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/124* | (2014.01) |
| *H04N 19/186* | (2014.01) |
| *H04N 19/30* | (2014.01) |

(Continued)

(52) U.S. Cl.
CPC ......... *H04N 19/124* (2014.11); *H04N 19/146* (2014.11); *H04N 19/186* (2014.11); *H04N 19/1883* (2014.11); *H04N 19/395* (2014.11)

(58) Field of Classification Search
CPC .. H04N 19/63; H04N 19/124; H04N 19/1883; H04N 19/146
See application file for complete search history.

(56) References Cited

U.S. PATENT DOCUMENTS

| | | | | |
|---|---|---|---|---|
| 6,351,491 | B1* | 2/2002 | Lee ...................... | H04N 19/147 375/240.03 |
| 6,904,091 | B1* | 6/2005 | Schelkens .............. | H04N 19/64 375/240.03 |

(Continued)

FOREIGN PATENT DOCUMENTS

JP    2010-183402 A    8/2010

OTHER PUBLICATIONS

Lu et al. "H.264-Compatible Coding of Background Soccer Video using Temporal Subbands." 2012 IEEE International Symposium on Multimedia. IEEE, (Year: 2012).*

*Primary Examiner* — Fabio S Lima

(74) *Attorney, Agent, or Firm* — Venable LLP

(57) ABSTRACT

An image encoding apparatus of the present invention comprises a frequency converting unit which executes frequency conversion on the data of a frame in moving image data, and generates coefficient data of a plurality of subbands, an encoding unit which quantizes the coefficient data acquired by the frequency converting unit in accordance with a quantization parameter, and encodes the quantized coefficient data, and a code amount controlling unit which controls the encoding unit such that a code amount generated by the encoding unit achieves a target code amount are provided. Here, the code amount controlling unit determines a subband target code amount of each of the plurality of subbands by distributing the target code amount to the plurality of subbands based on a ratio determined according to an indicator indicating a difficulty calculated for each of the plurality of subbands.

10 Claims, 7 Drawing Sheets

(51) Int. Cl.
*H04N 19/146* (2014.01)
*H04N 19/169* (2014.01)

(56) References Cited

U.S. PATENT DOCUMENTS

| | | | | |
|---|---|---|---|---|
| 7,372,903 | B1 * | 5/2008 | Lee | H04N 19/172 |
| | | | | 375/240 |
| 8,654,839 | B2 * | 2/2014 | Arakawa | H04N 19/172 |
| | | | | 375/240.03 |
| 2004/0240742 | A1 * | 12/2004 | Takahashi | H04N 19/147 |
| | | | | 382/232 |
| 2005/0002574 | A1 * | 1/2005 | Fukuhara | H04N 19/647 |
| | | | | 382/232 |
| 2006/0159355 | A1 * | 7/2006 | Mizuno | H04N 19/147 |
| | | | | 382/239 |
| 2008/0181522 | A1 * | 7/2008 | Hosaka | H04N 19/63 |
| | | | | 382/251 |
| 2010/0202513 | A1 | 8/2010 | Arakawa et al. | |
| 2013/0300893 | A1 * | 11/2013 | Takada | H04N 19/635 |
| | | | | 348/223.1 |

* cited by examiner

IMAGE ENCODING APPARATUS AND CONTROL METHOD THEREOF

BACKGROUND OF THE INVENTION

Field of the Invention

The present invention relates to a technique for encoding image data.

Description of the Related Art

Currently, digital devices for recording moving images such as digital video cameras are in widespread use, and in recent years, RAW image recording that was applied only to still images has also been applied to moving image recording. The data amount required for recording the above RAW image is huge, but advanced users among users of image capturing apparatuses prefer to use RAW images since correction and deterioration of the original image can be minimized, and the degree of freedom for image editing after shooting is high.

In order to record a RAW moving image to a recording medium such as a memory card, it is necessary to compress and encode the RAW moving image at a certain compression rate, since recording is possible for a period corresponding to the capacity of the recording medium.

Generally, image sensors employ a Bayer array. In the Bayer array, different color components are arranged alternately, and thus correlation between adjacent pixels is low, and even if encoding is directly performed, the compression efficiency is low. In view of this, the encoding efficiency has been improved by separating image data in the Bayer array into an image plane constituted only by R components, an image plane constituted only by G1 components, an image plane constituted only by G2 components, and an image plane constituted only by B component, and performing encoding for each plane.

Also, H.264 (H.264/MPEG-4 Part 10: Advanced Video Coding) is known as a conventional representative compression encoding system. In this compression encoding system, a data amount is compressed using time redundancy and space redundancy of the moving image, for each block constituted by a predetermined number of pixels within one frame.

In H.264 above, motion detection and motion compensation for time redundancy and the Discrete Cosine Transform (DCT) as frequency conversion for space redundancy, as well as techniques such as quantization and entropy encoding are combined. However, when the compression rate is raised to a certain degree or more, block distortion unique to DCT becomes marked, and image deterioration becomes subjectively conspicuous.

In view of this, a technique of decomposition into frequency bands called subbands by performing low pass filtering and high pass filtering in the horizontal direction and the vertical direction is adopted in JPEG 2000 as frequency conversion. In JPEG 2000, the Discrete Wavelet Transform (hereinafter, DWT) is used in order to perform frequency conversion on the frequency bands. Subband encoding is characterized in that block distortion is unlikely to occur and compression characteristics at the time of high compression are favorable, compared to an encoding technique that uses DCT.

In general code amount control, a target code amount of a frame to be encoded next is determined based on information regarding a frame that has been encoded. Code amount control is then performed by performing quantization control in which a quantization parameter Qp used for quantization is changed for each predetermined region of the image in order to converge the amount of generated code to the target code amount per frame. Note that while Qp is a parameter that makes it possible to reduce the code amount more, the greater the value of Qp is, Qp causes deterioration in image quality, and is therefore desirably as small as possible and constant in the screen.

In addition, the encoding efficiency can be improved by the ratio of Qps among the subbands having a predetermined relationship, and for example, in JPEG 2000, a relational expression in which a quantization parameter is set higher in a higher subband is defined as suggestive quantization. Particularly, in subband encoding, the target code amount of the image is distributed as subband target code amounts to the subbands, and quantization control is performed for each of the subbands, and thereby it is possible to perform quantization control, and compress the image data to a desired code amount.

However, as described above, if a target code amount is set for each subband, and Qp is changed for each predetermined region within the subband, if the subband target code amount is not set appropriately, even if the ratio of initial Qps set at the time of starting encoding of the subbands is set to the predetermined relationship, there is a possibility that the ratio of Qps of each of the subbands will deviate from the predetermined relationship partway through the screen.

As an example, change of Qp in the case where all the target code amounts of the subbands are set equally will be described. If the input image is an image having a large number of vertical lines, the target code amount of a horizontal frequency component needs to be set larger than the target code amount of a vertical frequency component such that the vertical lines do not deteriorate. However, if the target code amounts of the horizontal frequency component and the vertical frequency component are equal, control is performed such that Qp increases so as to suppress the code amount in the horizontal frequency component in which the amount of generated code is large, and thus deterioration occurs such as the vertical lines being blurred. Also in the setting of a target code amount of each plane after plane conversion, if the target code amount is not set appropriately, a problem similar to the above problem can occur.

In view of this, a technique for improving code amount controllability by changing the setting of a quantization matrix that is applied when performing encoding in order to appropriately distribute code amounts of luminance and color difference components is described in the document Japanese Patent Laid-Open No. 2010-183402. According to this document, it is possible to appropriately distribute a picture target code amount to a luminance code amount and a color difference code amount by scaling up the quantization value of luminance signals if the luminance code amount is greater than a predetermined value, and scaling up the quantization value of color difference signals if the color difference code amount is greater than a predetermined value, based on the ratio of the luminance code amount to the color difference code amount.

However, in the technique described in this document, the quantization values of the luminance signals and the color difference signals are independently changed, and thus there are cases in which optimal image quality cannot be acquired. If this is applied to the above-described setting of the target code amount for each subband and the target code amount for each plane, a problem also occurs. For example, consider a case in which the conventional technique is adopted in the relationship of quantization among subbands that underwent frequency conversion. In an image having a large number of vertical lines, if a quantization parameter is similarly set large only because the code amount of the subband corresponding to the horizontal component is large, the information rate of the horizontal component after encoding is reduced from the original image, the vertical lines are blurred, and the image quality deteriorates greatly.

In addition, the same applies to plane conversion from a RAW image into R, G1, G2 and B. For example, assume that the code amount of the plane B at the time of decomposition into the planes R, G1, G2 and B is extremely large. In this case, if the quantization parameter of the plane B is set larger than the other planes, information regarding blue component after encoding is extremely reduced from the original image, and the image quality deteriorates.

SUMMARY OF THE INVENTION

The present invention has been made in view of the above-described problem. Also, the present invention provides a technique for generating encoded data in which deterioration in image quality is suppressed, while achieving an encoded data amount.

According to an aspect of the invention, there is provided an image encoding apparatus for encoding moving image data, comprising: a frequency converting unit configured to execute frequency conversion on data of a frame in moving image data, and generate coefficient data of a plurality of subbands; an encoding unit configured to quantize the coefficient data acquired by the frequency converting unit in accordance with a quantization parameter, and encode the quantized coefficient data; and a code amount controlling unit configured to control the encoding unit such that a code amount generated by the encoding unit achieves a target code amount, wherein the code amount controlling unit determines a subband target code amount for each of a plurality of subbands by distributing the target code amount to the plurality of subbands based on a ratio determined according to an indicator indicating a difficulty calculated for the plurality of subbands.

According to the present invention, it is possible to generate encoded data in which deterioration in image quality is suppressed, while achieving a target encoded data amount.

Further features of the present invention will become apparent from the following description of exemplary embodiments (with reference to the attached drawings).

DESCRIPTION OF THE EMBODIMENTS

Embodiments according to the present invention will be described in detail below with reference to the attached drawings.

First Embodiment

Apparatus Configuration

Figure 1:
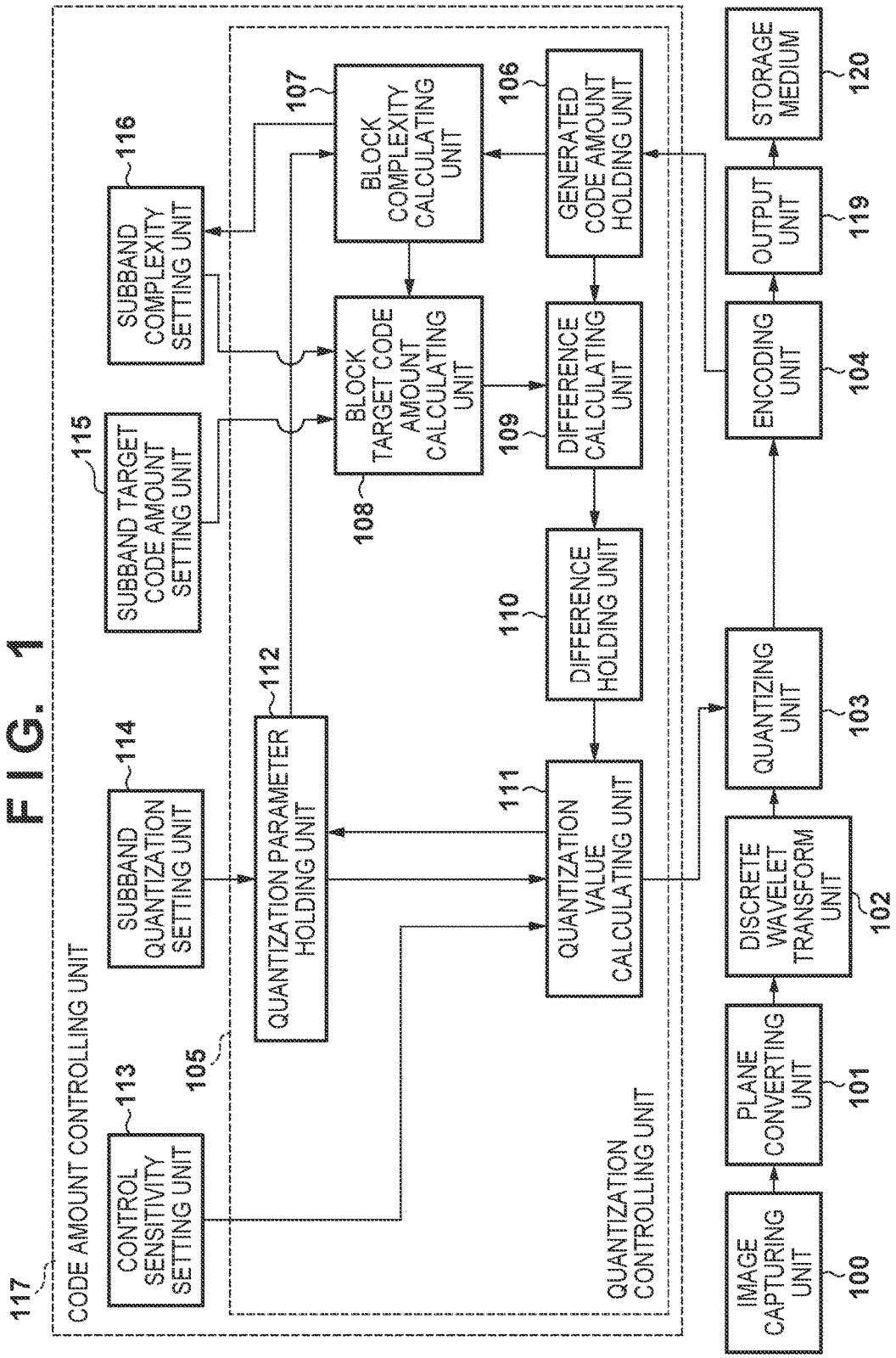
FIG. 1 is a block configuration diagram of an image encoding apparatus of embodiments of the present invention.

FIG. 1 is a block configuration diagram of an image encoding apparatus applied to a first embodiment. This image encoding apparatus is also applied to an image capturing apparatus such as a digital video camera. The image encoding apparatus has a main controlling unit (not illustrated) that performs overall control of the apparatus, and performs control of various processing units, which will be described below.

An image capturing unit 100 accommodates an optical lens, a Bayer array image sensor, an A/D converter and the like, and supplies captured moving image data in RAW format to a plane converting unit 101 in units of frames. 2×2 pixels in the Bayer array are constituted by one R (red) pixel, one B (blue) pixel and two G (green) pixels. Normally, the two G pixels are often expressed as G1 and G2 in order to distinguish those pixels from each other. Also, the image capturing unit 100 in the embodiment is assumed to supply 30 pieces of RAW image data per second, for example, to the plane converting unit 101.

Figure 2:
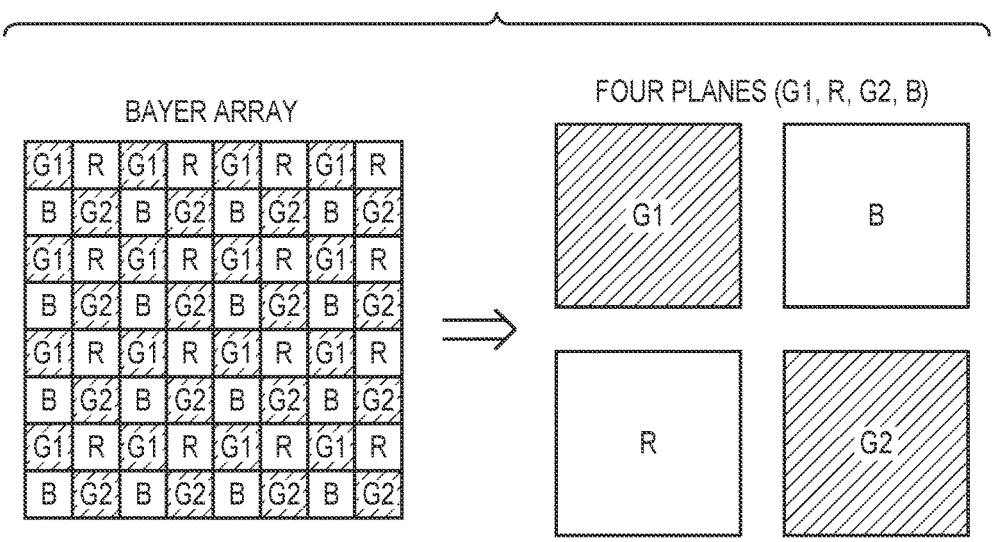
FIG. 2 is a diagram showing the correspondence relationship between a Bayer array and four planes R, G1, G2 and B.

The plane converting unit 101 generates, from one piece of RAW image data that has been input, four pieces of plane data, each of which is a single component. Here, the plane converting unit 101 in the embodiment generates, from the RAW image data that is formed of one frame, four planes, namely, a plane R, a plane G1, a plane G2 and a plane B, and supplies the four planes to a discrete wavelet transform unit 102. FIG. 2 shows the correspondence relationship between RAW image data (Bayer array) that has been input and the four planes R, G1, G2 and B. The plane converting unit 101 separates the RAW image data into the four planes, and carries out compression and encoding, and thereby it is possible to improve the correlation between pixels in a plane, and improve the compression efficiency, compared to an image in a Bayer array without any change.

The discrete wavelet transform unit 102 performs discrete wavelet transform (hereinafter, DWT), which is one form of frequency conversion, on each image data that is one plane (one of the planes R, G1, G2 and B that have been input). As a result, coefficient data (frequency region signals) of a plurality of subbands is generated, and the discrete wavelet transform unit 102 outputs the coefficient data (which will be described later in detail).

Note that the plane converting unit 101 in the embodiment generates four planes from one piece of RAW image data. A configuration may be adopted in which four discrete wavelet transform units 102 are positioned in parallel, and DWT is executed in parallel in order to shorten the time required for DWT. The same applies to a quantizing unit 103 and an encoding unit 104, which will be described later.

In addition, in DWT, filtering is normally performed on the entire image, but it is possible to perform filtering in the vertical direction and the horizontal direction at the timing at which pixels for the number of filter taps are stored in a memory. Therefore, if DWT is performed on one line of the input image at a time, and additionally DWT is recursively performed on a generated low-frequency subband (normally, an LL subband), it is possible to process subbands in parallel in units of lines. The discrete wavelet transform unit 102 sequentially supplies coefficient data of each subband of each plane acquired by performing frequency conversion to the quantizing unit 103.

The quantizing unit 103 quantizes the DWT coefficient data that is input, using a quantization parameter Qp that is set by a code amount controlling unit 117, and supplies the DWT coefficient data after being quantized to the encoding unit 104. The larger the value of the quantization parameter is, the more the code amount can be reduced, but on the other hand, if the value is large, deterioration in image quality becomes marked.

The encoding unit 104 encodes the quantized coefficient data supplied from the quantizing unit 103, generates encoded data, and supplies the encoded data to an output unit 119. The output unit 119 adds, to the encoded data the supplied from the encoding unit 104, a header including information required for decoding the encoded data, generates encoded data in a predetermined format, and writes the generated encoded data in a storage medium 120.

Next, the code amount controlling unit 117 in the first embodiment will be described.

The code amount controlling unit 117 includes a control sensitivity setting unit 113, a subband quantization setting unit 114, a subband target code amount setting unit 115, a subband complexity setting unit 116, and a quantization controlling unit 105, and performs code amount control that is based on various setting values for each subband, using those units.

The quantization controlling unit 105 updates Qp in units of lines so as to converge the amount of generated code of each subband to a subband target code amount. Therefore, the quantization controlling unit 105 performs control for each subband in units of lines. A generated code amount holding unit 106 holds, for each subband, the amount of generated code that is encoded data notified by the encoding unit 104.

A block complexity calculating unit 107 calculates complexity $X[i-1]$ of a line immediately before a line to be encoded next, in a subband of interest (which will be described later in detail). The complexities of lines calculated by the block complexity calculating unit 107 are integrated for each subband, and the integrated complexity is held in the subband complexity setting unit 116. Note that hereinafter, i indicates the line number of a line to be encoded.

A block target code amount calculating unit 108 calculates a target code amount $T[i]$ of the line to be encoded next within the subband of interest, according to a subband target code amount Tsb that is set by the subband target code amount setting unit 115, a subband complexity Xsb that is set by the subband complexity setting unit 116, and the block complexity $X[i-1]$ that is calculated by the block complexity calculating unit 107 (which will be described later in detail).

A difference calculating unit 109 calculates, for each line within the subband of interest, the difference between an amount-of-generated code $S[i-1]$ of the line held in the amount-of-generated code holding unit 106 and the block target code amount $T[i]$ that is output from the block target code amount calculating unit 108. A difference holding unit 110 holds, for each subband, an integrated difference value $\Sigma E[i-1]$ acquired by integrating the above calculated values.

Here, assume that, letting the target code amount of the subband of interest be T target, and the number of lines included in the subband of interest be M, a coordinate space is defined in which the horizontal axis is defined as the number of lines and the vertical axis is defined as a code amount. The integrated difference value $\Sigma E[i-1]$ indicates the degree of deviation from an ideal code amount transition line that connects the origin (0, 0) and (M, T target).

A quantization value calculating unit 111 uses the integrated difference value $\Sigma E[i-1]$ held in the difference holding unit 110, Qpini that is the initial Qp set by the subband quantization setting unit 114 and held in a quantization parameter holding unit 112, and a control sensitivity r that is set by the control sensitivity setting unit 113 in order to determine a quantization parameter $Qp[i]$ of the next (subsequent) line within the subband of interest. For simplification, the quantization value calculating unit 111 calculates the quantization parameter $Qp[i]$ of the line to be encoded next such that the absolute value of the integrated difference value $\Sigma E[i-1]$ is small (which will be described later in detail).

Discrete Wavelet Transform (DWT)

Figure 3:
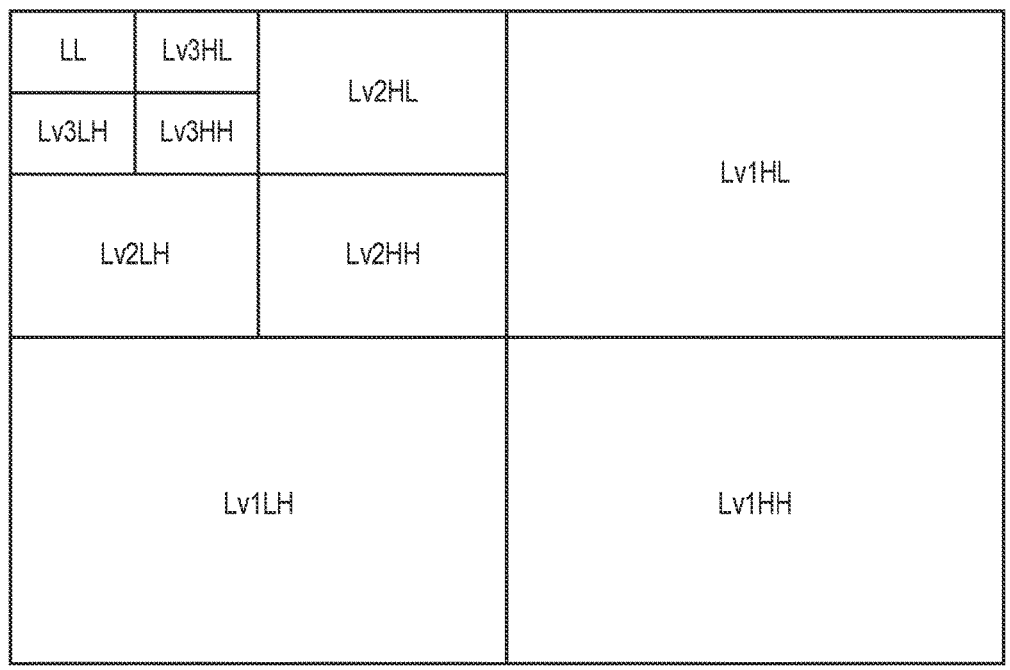
FIG. 3 is a diagram showing subband formation in the case where discrete wavelet transform (DWT) was performed three times.

FIG. 3 is a diagram showing formation of subbands at a decomposition level 3 in the case where vertical filtering processing and horizontal filtering processing of DWT are each performed three times.

In DWT, coefficient data of four frequency bands (subbands) HH, HL, LH and LL is generated by performing filtering vertically and horizontally. DWT is then recursively performed on the low-frequency (LL) subband generated by performing the above transform/conversion, and thereby it is possible to increase the number of decomposition levels, and as in FIG. 3, decrease the sizes of the subbands acquired by performing frequency decomposition. Note that "L" and "H" in FIG. 3 respectively denote a low-frequency band and a high-frequency band, with the former indicating a frequency band as a result of performing horizontal filtering, the latter indicating a frequency band as a result of performing vertical filtering, and the numeral after "Lv" indicating the decomposition level of DWT. Also, LL denotes the lowest-frequency subband.

The code amount controlling unit 117 in FIG. 1 performs code amount control such that the higher the frequency subband is, the larger the quantization parameter that is set, and the lower the frequency subband is, the smaller the quantization parameter that is set. Accordingly, the amount of generated code is compressed more in a higher frequency band component of image data that is difficult to visually recognize because of human visual characteristics, and thereby the encoding efficiency can be improved. Note that in FIG. 3, the number of times DWT is executed is three, but this is merely exemplary, and the number of times of DWT is not particularly limited.

Complexity Calculation

Complexity is an indicator that indicates a difficulty level of an image, and is a parameter whose value is larger as the image is more difficult, and is smaller as the image is simpler. A difficult image refers to an image from which a larger amount of code is generated when the entire image is encoded with a certain Qp. Therefore, complexity X is expressed as shown in Expression (1) below, using the quantization parameter Qp and an amount of generated code S.

$$X = Qp \times S \quad (1)$$

The block complexity calculating unit 107 calculates complexity of an immediately preceding line in order to calculate a block target code amount (a target code amount of a line to be encoded next).

If a quantization parameter Qp[i−1] used for encoding the immediately preceding line and an encoded data amount S[i−1] generated in encoding of the immediately preceding line are used, the complexity X[i−1] of the immediately preceding line can be expressed as shown in Expression (2) below in accordance with Expression (1).

$$X[i-1]=Qp[i-1]\times S[i-1] \quad (2)$$

Calculation of Block Target Code Amount

In each subband, a larger target code amount is assigned to a more difficult line of an image, and a smaller target code amount is assigned to an easier line, and thereby fluctuation of Qp can be made as small as possible in the subband.

In view of this, the block target code amount calculating unit 108 calculates a target code amount T[i] of a line to be encoded next within a subband of interest in accordance with a subband target code amount Tsb that is set by the subband target code amount setting unit 115, a subband complexity Xsb that is set by the subband complexity setting unit 116, and a block complexity X[i−1], based on Expression (3) below.

$$T[i]=Tsb\times X[i-1]/Xsb\_N-1 \quad (3)$$

As indicated by Expression (1), complexity is calculated using an amount of generated code, and is therefore a feedback amount that is not acquired unless encoding is performed. Therefore, for Xsb, a subband complexity Xsb_N−1 of a frame immediately before an N frame that is a frame of interest is fed back and used. Note that N is an integer, and the N frame indicates RAW image data of interest.

As in Expression (3), a large target code amount can be assigned to a difficult line and a small target code amount can be assigned to a simple line by multiplying Tsb by the ratio of complexity of a line of interest to the entire subband. As a result, fluctuation of Qp within the subband can be made as small as possible.

Quantization Control

There is a known technique shown in "MPEG-2 Test Model 5" that is one method for calculating a quantization parameter. In accordance with this technique, the quantization value calculating unit 111 calculates a quantization parameter Qp[i] of the next line using the integrated difference value ΣE[i−1] held in the difference holding unit 110, an initial quantization parameter Qpini held in the quantization parameter holding unit 112, and the control sensitivity r that has been set by the control sensitivity setting unit 113, as in Expression (4) below.

$$Qp[i]=Qpini+r\times\Sigma E[i-1] \quad (4)$$

Note that the control sensitivity r is a parameter, and the greater the control sensitivity r is, the more quickly Qp[i] is caused to fluctuate according to the integrated difference value, and the more the code amount controllability improves. If "MPEG-2 Test Model 5" is used, the code amount can be controlled such that if the amount of generated code is greater than the target code amount, the quantization parameter is set large, and if the amount of generated code is smaller than the target code amount, the quantization parameter is set small.

Code Amount Control (Relationship of Quantization Parameter Among R, G1, G2 and B)

It can be said that the planes generated by performing conversion into the planes R, G1, G2 and B in FIG. 2 are uniformly important planes, without importance being placed according to human visual characteristics and without any plane being prioritized. Therefore, it is desirable that Qp is the same in all the planes.

In addition, regarding the subbands that represent frequency bands, it is said to be effective to set a large Qp for coefficient data of a subband whose space frequency is high, and to which humans are considered to be insensitive because of their visual characteristics.

Figure 4:
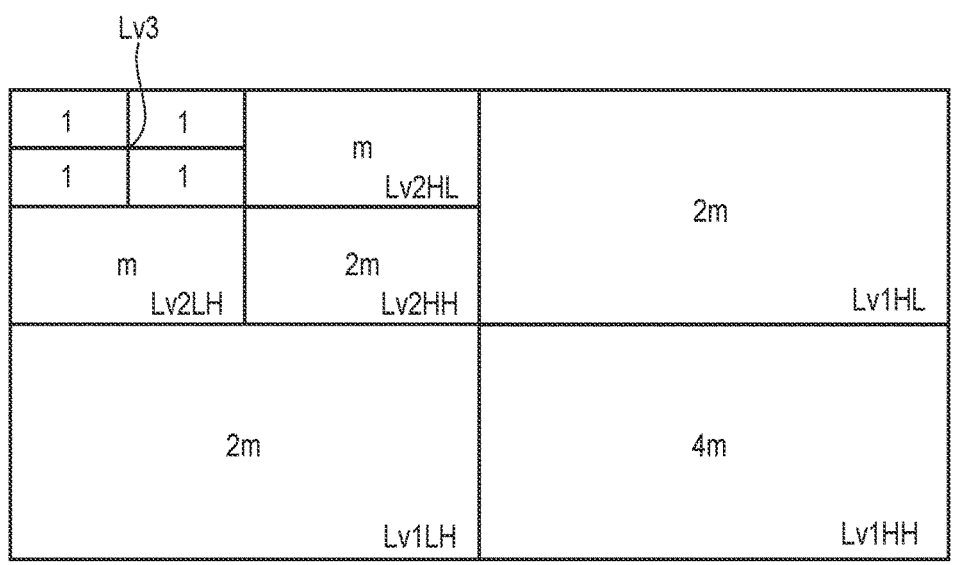
FIG. 4 is a diagram showing the relationship between decomposition levels and Qps acquired by performing DWT according to the embodiments.

FIG. 4 is an explanatory view showing an example of the relationship of Qp in the case where the number of decomposition levels acquired by performing DWT in the embodiment is three. Note that "m" is a value that is adjusted according to the image target code amount, and a value acquired by multiplying the ratio of each of the subbands by m is used as the actual Qp.

As shown in FIG. 4, the quantization parameters of the HL subband and the LH subband are the same at the same resolution level, and the value of the quantization parameter of the HH subband is twice that of the HL (or LH) subband.

Also, subbands of the same type at different decomposition levels have a relationship in which the value m in a subband at a higher level is half the value m in a subband at a lower level. Furthermore, subbands at the resolution level Lv3 represent lower frequency components, and from the viewpoint of image quality, a configuration may be adopted in which such subbands are not quantized regardless of the type of image and the image target code amount.

Note that the relationship of Qps shown in FIG. 4 fulfills the above-described concept that a larger Qp is set in a subband whose space frequency is higher. It is possible to realize high image quality compared to the case where Qp of a low frequency band and Qp of a high frequency band are set the same and code amount control is performed, by performing compression and encoding in consideration of the ratio of Qp among subbands as described above. The Qp ratio relationship that contributes to the high image quality as mentioned here is hereinafter referred to as the "predetermined Qp relationship".

The Qp initial setting as described above can be performed by the subband quantization setting unit 114 in advance. However, if a subband target code amount is not appropriate, there are cases where the Qp relationship deviates from the predetermined Qp relationship partway through the screen.

Figure 5A:
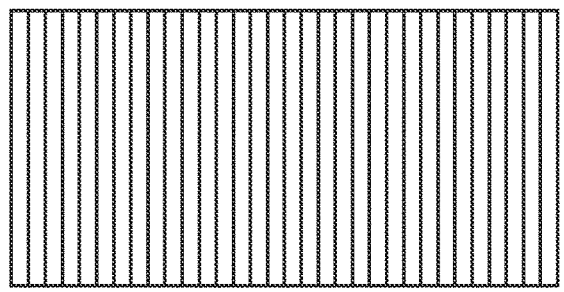
FIG. 5A is a diagram showing an example of an image.
Figure 5B:
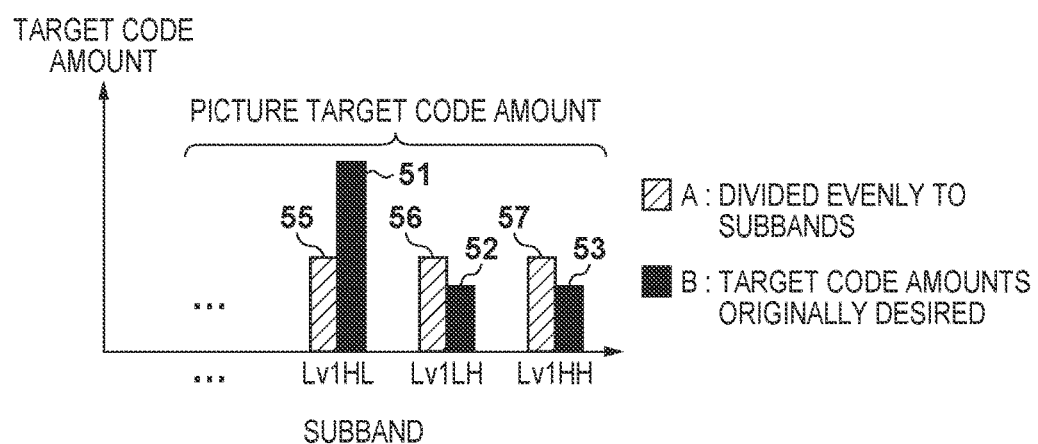
FIG. 5B is a diagram showing the relationship between Qps uniformly assigned at each decomposition level and Qps assigned in the embodiments.
Figure 5C:
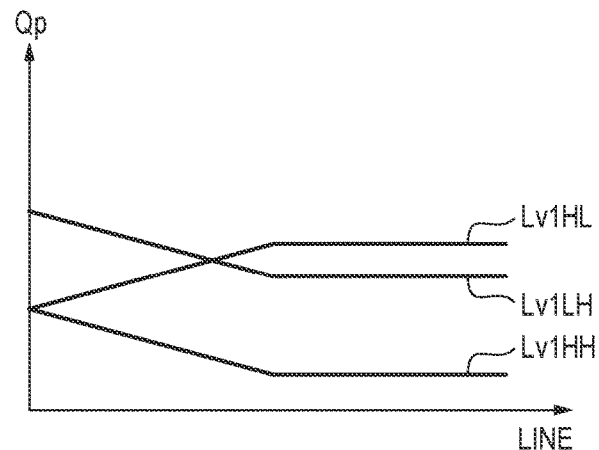
FIG. 5C is a diagram showing the transition of Qps of subbands at a decomposition level 1 in a first embodiment.

An example will be described in which the Qp relationship in the subbands deviates from the predetermined Qp relationship, with reference to FIGS. 5A to 5C. FIG. 5A shows an example of an image having a large number of vertical lines, and FIG. 5B shows the relationship of target code amounts. FIG. 5C shows the transition of Qps within one frame.

As in FIG. 5A, in the case of an image having a large number of vertical lines, the ratio of the complexity of the HL subband corresponding to a horizontal component is larger compared to the other subbands. Therefore, as indicated by reference numerals 51 to 53 in FIG. 5B, it is desirable that a larger target code amount is set for the HL subband than other LH and HH subbands.

However, here, a case is considered in which the same target code amount has been set for the HL, LH and HH subbands as shown by the reference numerals 55 to 57 in FIG. 5B. In this case, even if the initial Qps are set based on the predetermined Qp relationship, in the HL subband, quantization control operates in a direction in which Qp becomes larger in an attempt to suppress the code amount, and in the LH and HH subbands, quantization control operates in a direction in which Qp becomes smaller in an attempt to increase the code amount. Therefore, as in FIG. 5C, there is a high possibility that the predetermined Qp relationship collapses while one frame is being encoded, and deterioration in image quality occurs.

A method for setting a subband target code amount in this embodiment will be described below in which the collapse of the predetermined Qp relationship as described above is prevented.

As shown in FIG. 1, the RAW image data for one frame of a moving image that has been input is subjected to processing performed by the plane converting unit 101, the discrete wavelet transform unit 102 and the quantizing unit 103. In this embodiment, a target code amount is set for each subband, and thus a target code amount for one frame that has already been determined based on a bit rate is distributed as subband target code amounts. In view of this, first, a method for distributing the image target code amount to the planes R, G1, G2 and B will be described.

The predetermined Qp relationship for the planes R, G1, G2, and B as in FIG. 2 is a relationship of 1:1 between any planes as described above. In view of this, complexity is used to ensure that the Qp relationship between planes becomes 1:1.

The complexity is the integration amount of the amount of generated code and Qp as described using Expression (1), and is a parameter whose value is larger as the image is more difficult. In addition, a relationship is adopted in which the larger Qp is, the smaller the amount of generated code becomes, and thus the complexity of a certain image, plane and subband is constant regardless of Qp. In view of this, the image target code amount of one frame (RAW image data) is distributed to four planes using the ratio of this complexity as the ratio of the target code amount.

Figure 6:
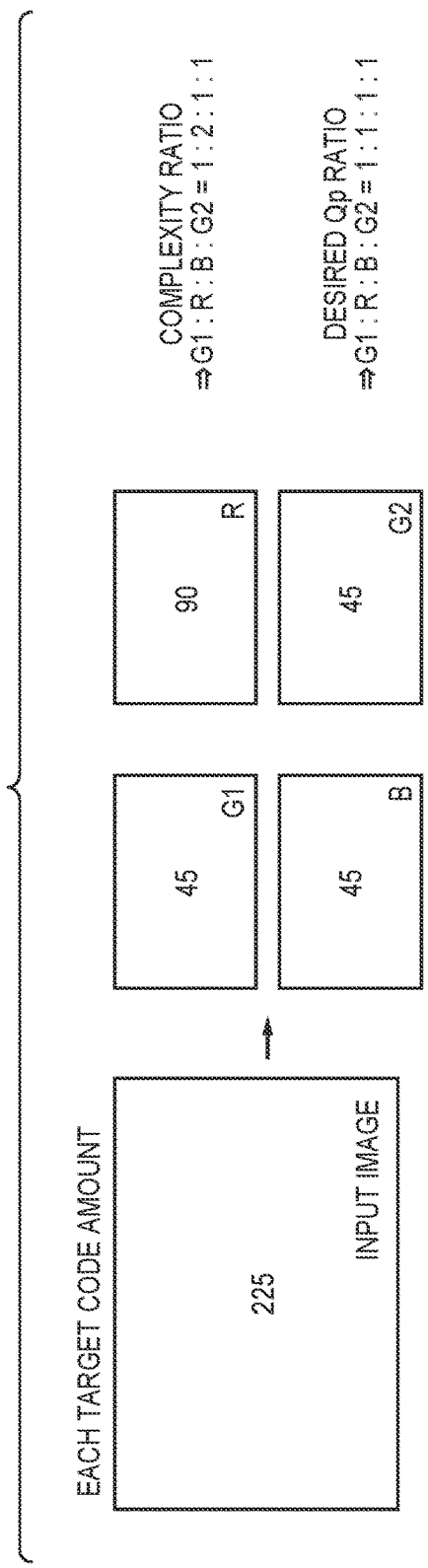
FIG. 6 is a diagram showing an example of distributing an image target code amount to plane target code amounts in the embodiments.

FIG. 6 shows an example of distributing the image target code amount to plane target code amounts. Assume that the ratio of complexities in a preceding frame is G1:R:B:G2=1: 2:1:1. In this case, according to Expression (1), a code amount that is twice as large as those of the other planes is generated in the plane R even if encoding is performed with the same Qp as the other planes. In view of this, in this embodiment, the ratio of the target code amounts of the planes of the subsequent frame is set to G1:R:B:G2=1:2:1:1 similarly to the ratio of complexities. In reference to FIG. 6, if the frame target code amount per frame that has been set in advance is "225", the target code amounts of the planes of the subsequent frame are set to G1=45, R=90, B=45 and G2=45. With such a configuration, convergence into a predetermined target code amount is possible while maintaining the same Qp value in all the planes, namely, the predetermined Qp relationship.

To summarize the above, a target code amount Tpl of a plane of interest is calculated using a target code amount Tpic (known) for one frame, an image complexity Xpic indicating the total of the plane complexities of the planes R, G1, G2 and B in the preceding frame, and a complexity Xpl of a plane of interest in the preceding frame, as expressed by the following expression (5).

$$Tpl = Tpic \times Xpl / Xpic \quad (5)$$

Note that Xpl and Xpic can be acquired by adding the subband complexities Xsb for one plane or one frame.

Next, a distribution method of subband target code amounts within one plane will be described. For simplification, first, the distribution method at the DWT decomposition level 1 will be described.

Figure 7:
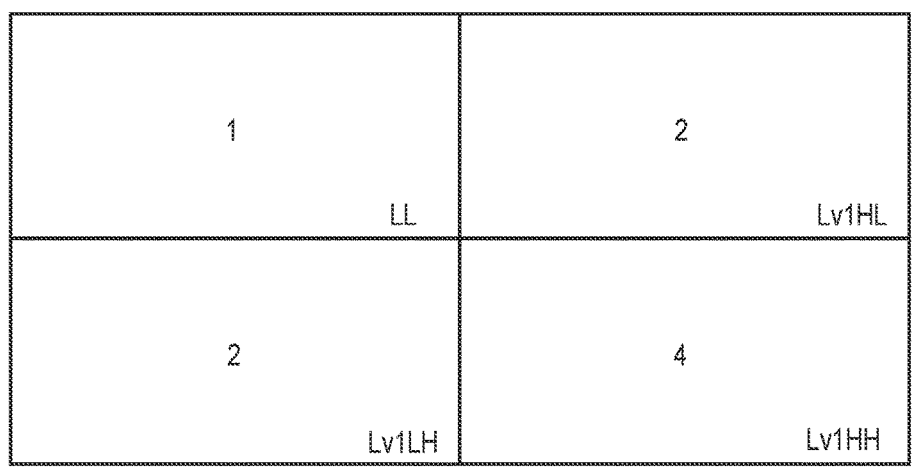
FIG. 7 is a diagram showing an example of the relationship of Qps at the decomposition level 1 in DWT according to the embodiments.
Figure 8:
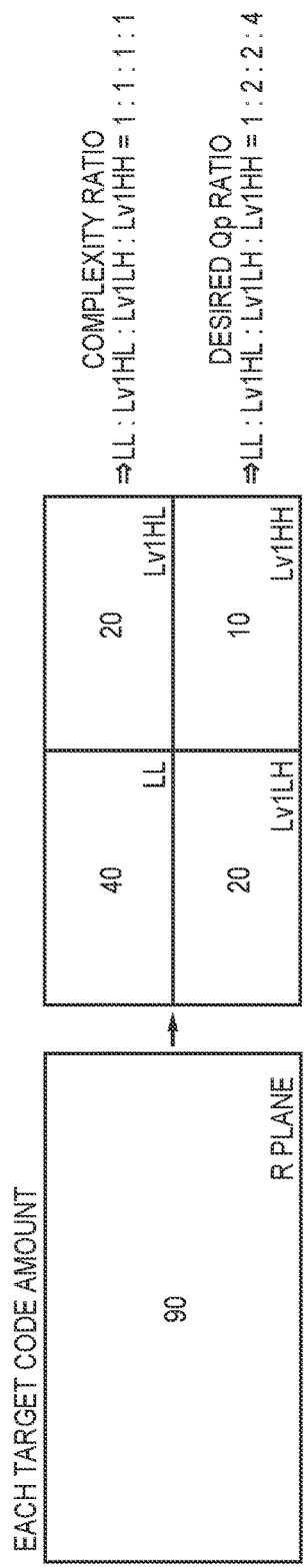
FIG. 8 is a diagram showing an example of distributing an R plane target code amount to subband target code amounts according to the embodiments.

FIG. 7 shows a ratio example of the predetermined Qp relationship at the decomposition level 1. FIG. 8 shows an example of distributing an R plane target code amount to subband target code amounts. As shown in FIG. 7, the predetermined Qp relationship at a level Lv1 is set to LL:Lv1HL:Lv1LH:Lv1HH=1:2:2:4.

As with the image target code amount being distributed to plane target code amounts, subband target code amounts are acquired by distributing a plane target code amount to the subbands.

The above ratio of complexities is also used in distribution to the subband target code amounts. However, if the target code amount is distributed using the complexities only, the Qp relationship between subbands will be 1:1 as described above. In view of this, the subband target code amounts are set by further using the predetermined Qp relationship in addition to this ratio of complexities.

Specifically, the ratio of complexities is multiplied by a predetermined weight $\alpha sb$. The relationship of this predetermined weight among the subbands is set to LL:Lv1HL:Lv1LH:Lv1HH=1:1/2:1/2:1/4=4:2:2:1, namely, the inverse of the ratio of the predetermined Qp relationship such that the ratios of Qps will be LL:Lv1HL:Lv1LH:Lv1HH=1:2:2:4. The complexity is multiplied by the weight of a subband acquired in this manner, and the subband target code amount is set using the weighted complexity.

An example will be described below in which the above configuration is applied. Assume that the ratio of complexities of the subbands of a preceding frame is LL:Lv1HL:Lv1LH:Lv1HH=1:1:1:1. With reference to FIG. 8, the R plane target code amount that is assigned from the image target code amount to the plane R is "90", and distribution to the target code amounts of the subbands is performed such that LL is 40, Lv1HL is 20, Lv1LH is 20 and Lv1HH is 10.

If the subband target code amounts are provided in this manner, control operates such that the amount of generated code equals the target code amount according to Expression (1), and thus the ratio of Qps is LL:Lv1HL:Lv1LH:Lv1HH=1:2:2:4, which is the predetermined Qp relationship.

To summarize the above, the subband-of-interest target code amount that is based on the predetermined Qp relationship in FIG. 7 can be distributed as follows:

$$Tpl = (Tpl \times XLL/Xpl \times \alpha LL + Tpl \times XLv1HL/Xpl \times \alpha Lv1HL + Tpl \times XLv1LH/Xpl \times \alpha Lv1LH + Tpl \times XLv1HH/Xpl \times \alpha Lv1HH) \times \beta pl = Tpl/Xpl \times \beta pl \times (XLL \times \alpha LL + XLv1LH \times \alpha Lv1LH + XLv1LH \times \alpha Lv1LH + XLv1LH \times \alpha Lv1LH) \quad (6)$$

$$Tsb = Tpl \times Xsb/Xpl \times \alpha sb \times \beta pl \quad (7)$$

Note that Xsb is the complexity of the subband of interest, $\alpha sb$ is the weight of the subband of interest, and $\beta pl$ is an adjustment value for converging the total target code amount of the subbands included in a plane of interest to a plane-of-interest target code amount, and other variables whose initial character is X or T are a complexity or a target code amount of a subband indicated by a subband name provided after X or T.

Furthermore, the target code amount in the case where the number of times DWT is carried out in this embodiment is three, and the predetermined Qp relationship in the case in FIG. 4 is adopted is expressed by Expression (8) below.

$$Tpl = (TLL + TLv3HL + TLv3LH + TLv3HH) = Tpl/Xpl \times \beta pl \times (XLv2HL \times \alpha Lv2HL + XLv2LH \times \alpha Lv2LH + XLv2HH \times \alpha Lv2HH + XLv1HL \times \alpha Lv1HL + XLv1LH \times \alpha Lv1LH + XLv1HH \times \alpha Lv1HH) \quad (8)$$

Note that a target code amount of the subband of interest to be subjected to quantization is expressed by Expression (7).

If there is a subband that is not to be quantized, the amount of generated code of a subband of interest of an immediately preceding frame whose correlation with the frame of interest is high is used directly as the target code amount of the subband that is not to be quantized, which is subtracted from the plane target code amount in advance, and thereby other subband target code amounts can be calculated using the same method as the example shown using Expression (7).

In addition, considering that the amount of generated code in a subband of the frame will be the same as a subband target code amount that has been set, initial Qp of the subband to be subjected to quantization can be calculated from Expression (1) by Xsb/Tsb, and the relationship of Qps among the subbands acquired in this manner will achieve the predetermined Qp relationship.

If the target code amounts of planes and subbands are set in this manner, the amounts of generated codes in the case where all the subbands are encoded with the predetermined Qp relationship can be predicted. Therefore, even if quantization control is performed in units of lines, convergence to subband target code amounts is enabled without deviation from initial Qps of the subbands that are set with the predetermined Qp relationship, and code amount control of the screen can be carried out.

With such a configuration, the target code amounts of planes and subbands can be set using the complexity of the image and the predetermined relationship of quantization parameter among the planes and the subbands, and the image quality can be improved.

Note that if frame correlation with the immediately preceding frame is low, there is a possibility that the value of complexity that is used is different from the value of complexity of the frame, and deviation from the predetermined Qp relationship occurs while encoding is being performed. However, in general, correlation between frames is sufficiently high, and problems such as described above do not occur. In addition, if the correlation between frames is low, this is called a scene change, and a code amount control method different from that in a normal case is generally used. Therefore, the above control may be adopted with respect to a scene change.

In the first embodiment, the plane converting unit 101 converts a RAW image for one frame that has been input into four planes R, G1, G2 and B, but the number of planes is not limited, and for example, setting the number of planes of RAW image data that is input to one, and performing processing after DWT and the like on the one plane is within the scope of the present invention. Similarly, also regarding DWT decomposition levels, the number of times decomposition is performed is not limited, and zero times of DWT being performed for directly quantizing the plane, and filtering up to a plurality of times of decomposition such as four times or more of DWT are also within the scope of this embodiment. Furthermore, similarly, the present invention is not limited to the concept of not quantizing Lv3 indicated by the predetermined quantization relationship, and for example, cases such as where only LL is not quantized at the DWT decomposition level 3 are also within the scope of the present invention. Moreover, in this embodiment, quantization control is performed for each line, but is not limited thereto, and carrying out quantization control for each rectangular block that is greater than or equal to 1 pixel×1 pixel is also within the scope of the present invention.

Second Embodiment

A second embodiment will be described below. An apparatus configuration of the second embodiment is the same as that in FIG. 1 in the above first embodiment. A difference from the above first embodiment is that complexities of planes are also weighted similarly to the method for setting a target code amount for each subband described in the first embodiment.

Plane conversion is not limited to the method in FIG. 2 in which the Bayer array is separated into planes by each color component. In general, humans are sensitive to the luminance components of an image because of their visual characteristics. Therefore, a method for improving the encoding efficiency by performing separation into a plurality of planes composed of luminance components and color difference components, and leaving a greater information amount of the luminance components compared to the color difference components is also used in conventional encoding methods.

In view of this, in the case of performing plane separation for decomposing the Bayer array into a plurality of planes composed of a luminance plane and a color difference plane, the Qp relationship between planes should not be set to 1:1 as in the case of the planes R, G1, G2 and B described in the first embodiment. In this case, Qp of the luminance plane should be greater than Qp of the color difference plane as the predetermined Qp relationship.

In view of this, the concept of weighting described in the first embodiment is also adopted in distribution of a target code amount to the planes.

Letting the weight of a plane of interest that is derived from the relationship of the inverse of the predetermined Qp relationship be $\alpha pl$, the target code amount of the plane of interest can be expressed as shown in Expression (9) below.

$$Tpl = Tpic \times Xpl/Xpic \times \alpha pl \times \beta pic \qquad (9)$$

Here, $\beta pic$ is an adjustment value for converging the total target code amount of the planes included in an image of interest to an image-of-interest target code amount.

With such a configuration, also in the case where it is desired to perform encoding using a Qp that is different for each plane, target code amounts for planes and subbands can be set using the complexity of the image and the predetermined relationship of quantization parameter between the planes and between the subbands, and the image quality can be improved.

Note that the case where $\alpha pl$ is 1 and $\beta pic$ is 1 in Expression (9) is equivalent to a method for setting a plane target code amount in the case where the Qp relationship between planes that is expressed by Expression (5) and has been described in the first embodiment is 1:1. Accordingly, to summarize the above, it is sufficient that the following is calculated in order to calculate subband target code amounts from the image target code amount. First, an image target code amount of a frame of interest is the total value of target code amounts of all the subbands, and can therefore be expressed as shown in Expression (10) below.

$$Tpic = \Sigma Tsb \qquad (10)$$

Expression (10) indicates that the integration value of all the subband target code amounts when the image of the frame of interest is decomposed into planes and subbands is Tpic.

From Expressions (7), (8) and (10), the following expressions hold.

$$Tpic = Tpic/Xpic \times \Sigma(Xsb \times \alpha'sb) \times \beta'pic \quad (11)$$

$$Tsb = Tpic/Xpic \times (Xsb \times \alpha'sb) \times \beta'pic \quad (12)$$

Note that $\alpha'sb$ is a weight of the subband to which a weight of the plane has been added, and which has been acquired by multiplying the weight $\alpha pl$ of the plane and the weight $\alpha sb$ of the subband. $\beta'pic$ is an adjustment value for converging the total target code amount of the subbands included in the image of interest to the image-of-interest target code amount.

Target code amounts of subbands can be derived without calculating a target code amount of a plane by using Expression (12), and the speed of the processing can be increased.

With such a configuration, the image quality can be improved by setting target code amounts of planes and subbands using the complexity of the image and the predetermined relationship of quantization parameter between the planes and between the subbands.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-118323, filed Jun. 14, 2016, which is hereby incorporated by reference herein in its entirety.

What is claimed is:

1. An image encoding apparatus for encoding moving image data, the apparatus comprising:
 a processor; and
 a memory storing instructions to be executed by the processor, wherein the instructions causes the apparatus to function as units comprising:
 (a) a plane converting unit configured to convert image data of a frame in the moving image data into a plurality of planes each constituted by a single component;
 (b) a frequency converting unit configured to execute frequency conversion on each plane obtained by the plane converting unit, and to generate, for each plane, coefficient data of a plurality of subbands;
 (c) an encoding unit configured to quantize the coefficient data acquired by the frequency converting unit in accordance with a quantization parameter, and to encode the quantized coefficient data; and
 (d) a code amount controlling unit configured to control the encoding unit such that a code amount generated by the encoding unit achieves a target code amount of one frame,
 wherein the code amount controlling unit determines, for a plane, a subband target code amount for each of a plurality of subbands by (a) distributing, based on an indicator indicating difficulty calculated for each of the plurality of planes and a predetermined weight for each of the plurality of planes, the target code amount of one frame to the plurality of planes as a plane target code amount of each plane, and (b) distributing, based on an indicator indicating difficulty calculated for each of the plurality of subbands of each plane and a predetermined weight for each subband of each plane, the plane target code amount of each plane to each of the plurality of subbands as the subband target code amount.

2. The apparatus according to claim 1, wherein the difficulty for each of the plurality of planes corresponds to the code amount of each of the plurality of planes of a previous frame, and
 wherein the difficulty for each of the plurality of subbands of each plane corresponds to the code amount of each of the plurality of subbands of each plane of the previous frame.

3. The apparatus according to claim 1, wherein the frequency converting unit is a discrete wavelet transform unit.

4. The apparatus according to claim 3, wherein the encoding unit:
 starts quantization in LL, HL, LH, and HH which are subbands at the same decomposition level, based on an initial quantization parameter that has a relationship of LL≤LH=HL≤HH, where the first letters L and H of each of two letters LL, LH, HL, and HH represent a low-frequency band and a high-frequency band as a result of performing horizontal filtering respectively, and the second letters L and H of each of two letters LL, LH, HL, and HH represent a low-frequency band and a high-frequency band as a result of performing vertical filtering respectively, and
 starts quantization at different resolution levels, based on an initial quantization parameter that is larger as a resolution level is lower.

5. The apparatus according to claim 1, wherein the plane converting unit converts RAW image data into a plurality of pieces of plane data each constituted by an R (red), G (green), or B (blue) single color component.

6. The apparatus according to claim 1, wherein the plane converting unit converts RAW image data into a plane constituted by a luminance component and plane data for each of a plurality of color difference components.

7. The apparatus according to claim 6, wherein the code amount controlling unit distributes the target code amount of one frame to plane data of the luminance component, using a weighting coefficient that is greater than a weighting coefficient of the plane data of the color difference components.

8. The apparatus according to claim 1, wherein the encoding unit:
   performs quantization in units of coefficient data for one line of a subband, and
   calculates a product of a quantization parameter used when the coefficient data for one line was quantized and an encoded data amount generated from the coefficient data for one line, as an indicator representing the difficulty.

9. A control method of an image encoding apparatus for encoding moving image data, the method comprising:
   converting image data of a frame in the moving image data into a plurality of planes each constituted by a single component;
   executing frequency conversion on each plane obtained by the converting, and generating, for each plane, coefficient data of a plurality of subbands;
   quantizing the coefficient data acquired in the frequency conversion in accordance with a quantization parameter, and encoding the quantized coefficient data; and
   controlling the encoding such that a code amount generated in the encoding achieves a target code amount of one frame,
   wherein in the controlling, a subband target code amount for each of a plurality of subbands is determined, for each plane, by (a) distributing, based on an indicator indicating difficulty calculated for each of the plurality of planes and a predetermined weight for each of the plurality of planes, the target code amount of one frame to the plurality of planes as a plane target code amount of each plane, and (b) distributing, based on an indicator indicating difficulty calculated for each of the plurality of subbands of each plane and a predetermined weight for each subband of each plane, the plane target code amount of each plane to each of the plurality of subbands as the subband target code amount.

10. A non-transitory computer-readable storage medium storing a program which, when read and executed by a computer, causes the computer to execute a method, the method comprising:
   converting image data of a frame in the moving image data into a plurality of planes each constituted by a single component;
   executing frequency conversion on each plane obtained by the converting, and generating, for each plane, coefficient data of a plurality of subbands;
   quantizing the coefficient data acquired in the frequency conversion in accordance with a quantization parameter, and encoding the quantized coefficient data; and
   controlling the encoding such that a code amount generated in the encoding achieves a target code amount of one frame,
   wherein in the controlling, a subband target code amount for each of a plurality of subbands is determined, for each plane, by (a) distributing, based on an indicator indicating difficulty calculated for each of the plurality of planes and a predetermined weight for each of the plurality of planes, the target code amount of one frame to the plurality of planes as a plane target code amount of each plane, and (b) distributing, based on an indicator indicating difficulty calculated for each of the plurality of subbands of each plane and a predetermined weight for each subband of each plane, the plane target code amount of each plane to each of the plurality of subbands as the subband target code amount.

* * * * *